Dec. 30, 1958 A. SANDOR 2,866,919

CATHODE RAY TUBE

Filed July 18, 1955 2 Sheets-Sheet 1

INVENTOR.
AURELIUS SANDOR
BY Theodore C. Jay Jr.
ATTORNEY

Dec. 30, 1958 A. SANDOR 2,866,919

CATHODE RAY TUBE

Filed July 18, 1955

2 Sheets-Sheet 2

INVENTOR.
AURELIUS SANDOR
BY Theodore C Jay Jr
ATTORNEY

United States Patent Office 2,866,919

Patented Dec. 30, 1958

2,866,919

CATHODE RAY TUBE

Aurelius Sandor, Forest Hills, N. Y., assignor to Sylvania Electric Products, Inc., a corporation of Massachusetts Application July 18, 1955, Serial No. 522,421

5 Claims. (Cl. 315—21)

My invention relates to cathode ray tubes adapted for color image display and methods for making the same.

The color television art has knowledge of one class of such tubes in which the color display appears on a planar image screen mounted within the tube envelope behind the viewing plate. The screen is coated with a plurality of horizontal, parallel, vertically displaced color triplet lines, each line containing first, second and third, horizontal, parallel, vertically displaced phosphor stripes. Each of these stripes, when irradiated by an electron beam, fluoresces to produce light in a different one of three primary colors as, for example, red, green, and blue. Each triplet line corresponds to one horizontal scanning line in the display raster. An electron gun mounted within the tube produces an electron beam small enough in cross section to irradiate only one color stripe at a time. The intensity of the beam is controlled in accordance with an incoming color television signal; the beam itself is deflected from one triplet to the next adjacent triplet line in a known manner. Auxiliary deflection means responsive to an incoming decoded color switching signal deflect the beam successively over each of the three phosphor stripes as the beam scans the triplet line containing these phosphor stripes.

This type of tube has certain disadvantages. For example, the beam is intensity modulated in turn by each primary color component of the demodulated color signal. To insure acceptable color rendition, the beam, when modulated by any primary color component must scan the phosphor stripe corresponding to this color and no other. As presently constituted, the beam deflection control obtainable with this tube is not sufficiently precise to insure that the beam is so positioned; the resultant color rendition is degraded. Further, the image screen of this tube has a linearly and uniformly deposited phosphor structure; in order to utilize the structure, the beam must be controlled and positioned to an accuracy not obtainable by conventional circuitry. As a result of these disadvantages, this type of tube has found little or no commercial acceptance.

I have discovered that a tube of this class, when prepared in the manner described in more detail hereinafter and provided with a simple indexing control circuit, can be so constructed as to obviate these difficulties.

Accordingly, it is an object of the present invention to provide a new and improved cathode ray tube of the character indicated.

A further object is to improve the color rendition of a cathode ray tube of the character indicated.

Still a further object is to provide in a cathode ray tube of the character indicated, new and improved indexing means integral with the image screen of such tube.

Yet a further object is to provide a new process for producing a cathode ray tube of the character indicated.

These and other objects of the invention will either be explained or will become apparent hereinafter.

In my invention there is provided a cathode ray tube adapted for color image display and provided with a tube envelope and an image screen deposited directly on the tube face or on an enclosed image plate. The image screen curvature may or may not conform to that of the tube face. The screen itself is provided with a plurality of essentially horizontal, essentially parallel, vertically displaced color triplet lines, each of which represents a horizontal line of the image raster. Each triplet line is composed of parallel, essentially horizontal, vertically adjacent first, second and third phosphor stripes. Each stripe, when successively irradiated by an electron beam, fluoresces and, either directly or indirectly, produces light of a different one of the three primary colors. The color triplet lines are covered with an electrically conductive layer such as aluminum.

The tube is further provided with an electron gun for producing an electron beam small enough in cross section to occupy one stripe at a time. The stationary spot size of the beam can be larger than the width of one color stripe; however, it is the apparent spot size caused by scanning action which must be no larger than this width. As is well known, the apparent vertical height of the spot is reduced with increasing scanning velocity. A gun also includes a conventional grid for controlling the intensity of said beam in accordance with an incoming color television signal, and beam deflection means for deflecting the beam to scan the horizontal triplet lines in conventional manner. The tube is further provided with auxiliary color deflection means which, in response to a conventional incoming color switching signal, deflect the beam upon the appropriate stripe of any triplet line. In other words, the beam successively scans each triplet line and during each scanning operation is "wobbled" or shifted up and down along the triplet being scanned to excite each of the different phosphor stripes in turn. In the unwobbled or central position, the beam irradiates a selected one of these stripes, for example, the second stripe.

The image screen is further provided with an aluminum coated indexing zone integral with the entire phosphor coating and adjacent one end of the light producing section of the screen. This zone contains a like plurality of vertically displaced indexing areas which are not coated with aluminum. Each area is positioned adjacent a corresponding triplet line in such fashion that adjacent indexing areas are separated by uniform aluminum bridges whose width does not exceed that of a phosphor stripe. These metallic bridges are aligned with the said selected stripes.

The aluminum zone is so positioned with respect to the light producing section, that the beam traverses the zone before scanning any of the triplet lines. When the beam in traversing the zone travels across any of the aluminum bridges, it is in proper position to begin a horizontal scanning operation, and will initially strike the desired selected phosphor stripe. However, when the beam travels across any of the indexing areas, the beam position if uncorrected, would be improper, and the color rendition would be degraded.

Therefore, the indexing areas are so shaped, for example, a triangular or trapezoidal shape, that the time period required for the beam to travel across any portion of an indexing area at a given constant velocity is proportional to or a predetermined function of the vertical separation between the actual beam position and the required beam position. Stated differently, the amount of correction required is proportional to or is a predetermined function of this period. I therefore provide means responsive to the length of such periods to derive therefrom a control signal which is supplied to the beam deflection means to correct the vertical position of the beam as it commences a horizontal scanning operation.

As is well known to the art, the conventional scanning operation is inherently non-linear, so that the vertical beam scanning velocity is variable, and the beam position will deviate from the desired horizontal scanning path. Consequently, during a horizontal scanning operation, the initial vertical correction of beam position described above can compensate for vertical scanning non-linearities. Due to the characteristics of the deflection yoke and the tube elements, constant pattern distortions are produced, and additional corrections must be made.

In my invention, these additional corrections are not required because of the image screen construction. In order to so construct the screen, I first produce a master tube differing only from the tube previously discussed in that the image screen is replaced by a photographic plate which can be removed from the tube after exposure as, for example, a plate commercially identified as "Kodalith." When the master tube is rendered operative, the beam scans the plate, thus providing a photographic impression of all the beam scanning paths. The photographic plate is then removed from the master tube and developed. By controlling the strength of the developing solutions and the time of development, the blackened traces of the spot on the plate can be widened to equal the desired stripe width. Then, using a second plate, a positive image is derived from the negative image thus developed on the original plate. Photoengraving or other color printing techniques well known to the art are then used to produce an image screen in which the phosphor pattern conforms to that of the photographic plate and hence conforms to the non-linear beam scanning paths of the master tube.

When the above described image replica technique is used, the phosphor pattern on the screen is in exact correspondence with the scanning pattern established through interaction of the beam and associated beam control apparatus.

In one embodiment, the three phosphor stripes forming each color triplet respectively produce red, green or blue light during fluorescence, i. e., these stripes are formed from different color phosphors. In a second embodiment, only a white fluorescence is used and different light optical filters (red, green, and blue) are interposed between the phosphor and the face plate of the tube to provide the proper color response. In this latter case colored transparent stripes can be deposited on the inner face during the screen forming process.

An illustrative embodiment of my invention will now be described in detail with reference to the accompanying drawings wherein.

Figure 1:
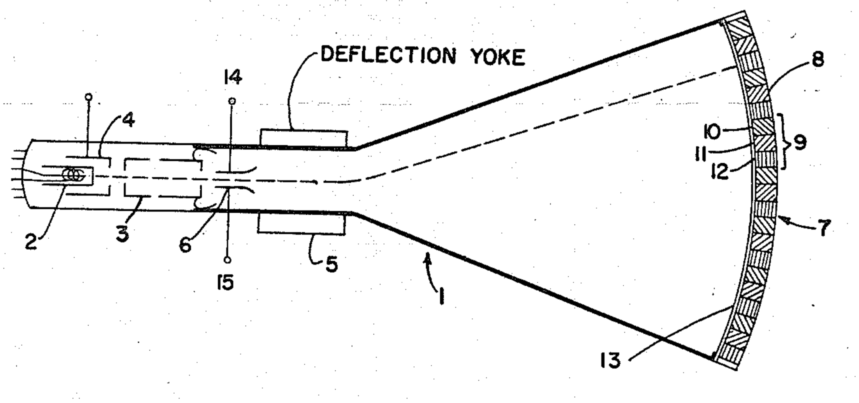
Figure 1 shows in longitudinal section one form of a cathode ray tube in accordance with the invention.

Referring now to Figure 1, there is provided a cathode ray tube identified generally at 1 and provided with an electron gun 2 for producing an electron beam, electrostatic beam focusing means 3, a control grid 4 for controlling the beam intensity, a deflection yoke 5, and a pair of electrostatic color deflection plates 6 positioned intermediate the focusing means and the deflection yoke. The tube is also provided with an image screen identified generally at 7 and having a curvature which conforms to that of the face plate 8 of the tube. (Alternatively, a separate flat image screen can be used.) The screen itself is formed from a plurality of essentially parallel, essentially horizontal, vertically separated color triplet lines 9, each line containing a red phosphor stripe 10, a green phosphor stripe 11, and a blue color stripe 12. The triplets are covered with an aluminum coating 13.

Figure 2:
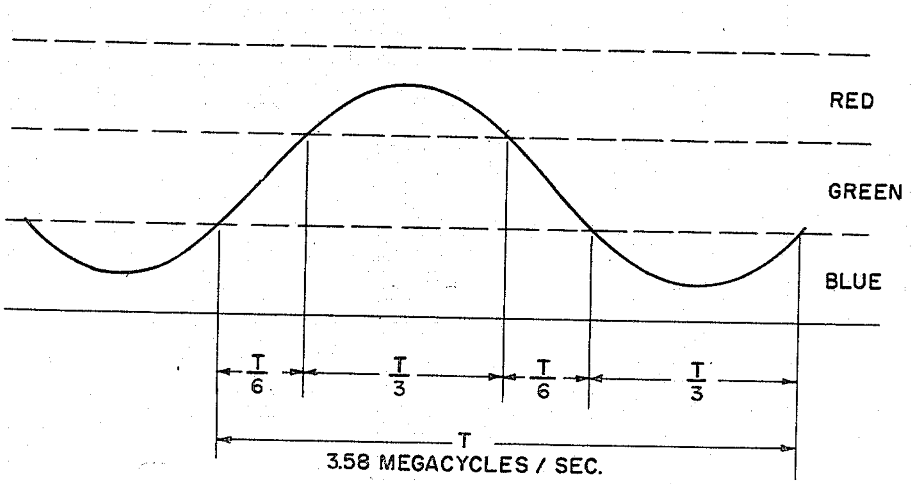
Figure 2 illustrates the wave form of the color switching signal utilized in my invention.

This tube operates in the following manner. A conventional incoming color television signal is supplied to the control grid 4 and intensity modulates the electron beam. The deflection yoke 5 and focusing means 3 are operated in conventional manner. However, applied between terminals 14 and 15 of deflection plates 6 is a conventional decoded color switching signal having the wave form as indicated in Figure 2. The resultant action of the color deflection plates on the electron beam (which scans each color triplet line in turn under the control of the deflection yoke) causes the beam to be wobbled or shifted up and down along the line being scanned to irradiate in turn each of the different phosphor stripes in the line. The switching signal is shown in Fig. 2 composed of a 3.58 mc./sec. sine wave superimposed on a direct current component. During each cycle of the sine wave, the beam is wobbled about all three phosphor stripes. As will be seen from Fig. 2, the beam is positioned on a green stripe when the amplitude of the switching signal falls in the green range. The beam is similarly positioned on a red or blue stripe when the amplitude of the switching signal falls within the red or blue range. The beam in its central unshifted position strikes the green stripe. The apparatus associated with this tube for supplying the color signal and the decoded switching signal thereto and the circuitry coupled to the deflection yoke to control the horizontal scanning operation are conventional and are not shown here.

As indicated previously, as a result of the photographic replica technique, the pattern of the color triplets and phosphor stripes on the screen corresponds to the generally non-linear beam scanning paths of the tube. Consequently, no linearity corrections are required. However, it is necessary to provide means which at the beginning of any horizontal scanning operation intially position the beam on a green color stripe; otherwise, the color rendition will be unacceptable.

Figure 3:
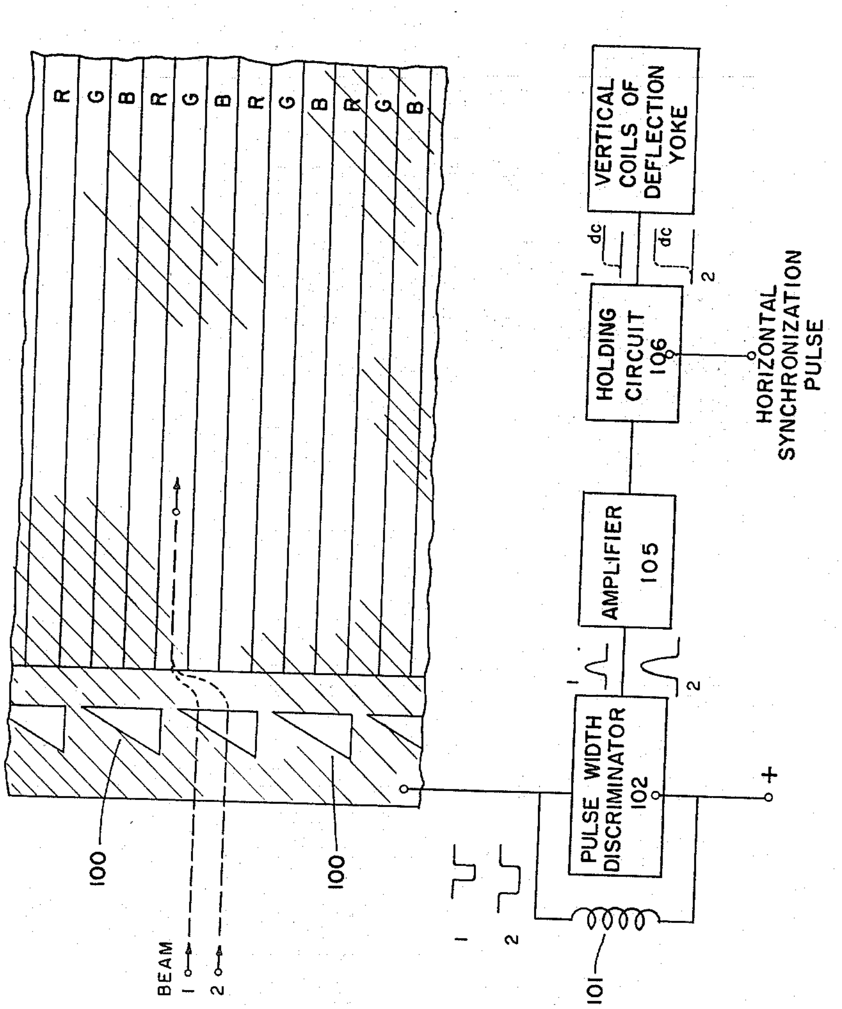
Figure 3 shows, greatly enlarged, a portion of the image screen including the aluminized indexing zone and also shows in block form the circuitry associated with the indexing zone and beam deflection control apparatus.

In Figure 3 it will be seen that the image screen, as viewed from the interior of the tube, is provided with the color triplet lines 9 and also is provided with a plurality of vertically displaced indexing areas 100, immediately adjacent the left end of the triplet lines. These areas have a generally triangular shape and are not covered with the aluminized layer. (Alternatively, a trapezoidal shape could be used.) The altitude of each area is somewhat less than the width of a color triplet. There is one such area associated with each color triplet line, adjacent indexing areas are separated by a narrow aluminum coated bridge which is in registration with a corresponding green color stripe. When the beam during any horizontal scanning operation travels across the aluminum bridge nad consequently is aligned with a green stripe, these indexing areas do not affect the tube operation. However, when the beam traverses a path which includes a portion of an open indexing area, the beam vertical position must be corrected, otherwise the beam would strike a red stripe or a blue stripe and produce faulty color rendition. The aluminum coating 15 of the screen is connected through a high frequency choke 101 to a point of high positive potential. Choke 101 is shunted by a pulse width discriminator 102, for example, a series circuit comprising an inductance and a capacitor. The output of the discriminator is connected through amplifier 105 to the input of a timing or holding circuit 106. The output of the holding circuit is connected to the vertical deflection coils of the deflection yoke 5 shown in Figure 1.

Since the indexing areas are not coated with the aluminum layer, as the beam travels across any portion of one of these areas the electric circuit established by the flow of current from the beam to the aluminum layer is broken momentarily, and a pulse of variable width is produced.

The pulse width, since the scanning velocity is constant, increases as the time required for the beam to travel across the indexing area increases. Because of the triangular or trapezoidal shape of these areas, the beam travel time increases as the vertical difference between the actual and desired beam positions increases. Therefore, the width of the pulse is proportional to or is a predetermined function of the amount of vertical correction required.

The pulse is fed to the discriminator which derives therefrom a control voltage whose amplitude is proportional to the width of the pulse. This is amplified and then supplied to the timing or holding circuit 106. Time synchronization pulses are also supplied to the holding circuit and the output of this circuit is coupled to the vertical deflection coils of the yoke.

The purpose of the holding circuit is to supply to the yoke a deflection voltage which will provide the desired vertical beam position correction. This is accomplished by maintaining the D. C. level of the amplified control constant while the entire horizontal line is scanned. Therefore, each line synchronization pulse clears or unlocks the holding circuit so that the amplified control voltage produced immediately after this line pulse establishes the D. C. level subsequently maintained by the holding circuit during the line scanning period. The next line pulse clears the circuit and prepares it to receive the next amplified control voltage.

As an alternate screen construction, the screen can comprise an aluminum coating, a continuous layer of a white phosphor, in contact with the coating and a plurality of color triplet lines, each composed of a red printed transparent stripe, a green transparent stripe, a blue transparent stripe all printed on the glass face plate of the cathode ray tube. These color stripes will produce red, green or blue light when the beam excites the white phosphor behind the filter stripes.

In order to insure that indexing pulses are generated when the beam is modulated with a black level signal, the grid of the cathode ray tube may be biased in conventional manner to insure that a small constant beam current will flow regardless of the presence or absence of a black level signal.

When a planar or slightly curved image screen is used, the beam length will vary with the beam position as any horizontal line is scanned; that is, the beam path length increases as the deflection angle increases. In order to correct for this variation in length, and consequent amplitude variation in the wobbling action, the amplitude of the color switching signal supplied to the color deflection plates should be decreased as compared to theoretical values as the deflection angle increases. This can be accomplished by dynamically correcting the amplitude of the color switching signal in known manner.

After a cathode ray tube has been constructed in the manner previously outlined, by slightly varying the direct current component of the yoke deflection voltages and at the same time slightly rotating the yoke itself, the beam can be brought into complete registration with the color stripes. Further, by adjusting the amplitude of the color switching signal, the red and blue color deflections can be adjusted as necessary.

In this arrangement, normal amplitude fluctuation of the color switching signal will have no deleterious effect on the system, because the beam color positioning action is insensitive to such fluctuations.

Further, the linearity requirements of all associated circuitry are on the same order as in conventional monochrome television systems.

While I have shown and pointed out and described my invention in one preferred embodiment, it will be apparent to those skilled in the art that many modifications can be made within the scope and sphere of my invention as defined in the claims which follow.

What is claimed is:

1. In a cathode ray tube adapted for color image display, in combination, an image screen coated with an electrically conductive layer and provided with a light producing section and an indexing zone adjacent one side of said section, said section being formed from a plurality of essentially parallel, essentially horizontal, vertically displaced color triplet lines, each line containing first, second and third essentially parallel, essentially horizontal, vertically displaced color stripes, said zone containing a like plurality of vertically displaced indexing areas which are not coated with said layer, each area being positioned adjacent one end of a corresponding line, adjacent indexing areas being separated by a separation bridge having a width not exceeding that of any of said stripes, said bridge being in registration with a corresponding selected one of said color stripes.

2. The combination as set forth in claim 1 wherein the said indexing areas are shaped in such manner that, in any of said areas, the ratio of the horizontal to the vertical dimension for any horizontal electron beam scanning path across said any area is proportional to the vertical separation between said path and the separation bridge separating said any area from the upper adjacent indexing area.

3. The combination as set forth in claim 2 wherein said indexing areas have a triangular shape.

4. In a cathode ray tube adapted for color image display, in combination, an image screen coated with an electrically conductive layer and provided with a light producing section and an indexing zone adjacent one side of said section, said section being formed from a plurality of essentially parallel, essentially horizontal, vertically displaced color triplet lines, each line containing first, second and third essentially parallel, essentially horizontal, vertically displaced color stripes, said zone containing a like plurality of vertically displaced indexing areas which are not coated with said layer, each area being positioned adjacent one end of a corresponding line, each area being shaped in such manner that, in any of said areas, the ratio of the horizontal to the vertical dimension for any horizontal electron beam scanning path across said any area is proportional to the vertical separation between said path and the separation bridge separating said any area from the upper adjacent indexing area, adjacent indexing areas being separated by a separation bridge having a width not exceeding that of any of said stripes, said bridge being in registration with a corresponding selected one of said color stripes, means to produce an electron beam, and means to deflect said beam, said beam when crossing any of the indexing areas producing a pulse whose width is proportional to the time required for the beam to traverse said area.

5. In a cathode ray tube adapted for color image display, in combination, an image screen coated with an electrically conductive layer and provided with a light producing section and an indexing zone adjacent one side of said section, said section being formed from a plurality of essentially parallel, essentially horizontal, vertically displaced color triplet lines, each line containing first, second and third essentially parallel, essentially horizontal, vertically displaced color stripes, said zone containing a like plurality of vertically displaced indexing areas which are not coated with said layer, each area being positioned adjacent one end of a corresponding line, each area being shaped in such manner that, in any of said areas, the ratio of the horizontal to the vertical dimension for any horizontal electron beam scanning path across said any area is proportional to the vertical separation between said path and the separation bridge separating said any area from the upper adjacent indexing area, adjacent indexing areas being separated by a separation bridge having a width not exceeding that of any of said stripes, said bridge being in registration with a corresponding selected one of said color stripes, means to produce an electron beam, means to deflect said beam, said beam when crossing any of the indexing areas producing a pulse whose width is proportional to the time required for the beam to traverse said area, means responsive to the width of said pulse to derive a control voltage therefrom and means to supply said control voltage to said deflector means in a direction at which the beam is always positioned in registration with the bridge immediately above the scanned area before any triplet line is scanned.

References Cited in the file of this patent

UNITED STATES PATENTS

| | | |
|---|---|---|
| 2,168,444 | Lake | Aug. 8, 1939 |
| 2,310,863 | Leverenz | Feb. 9, 1943 |
| 2,543,623 | Fisher | Feb. 27, 1951 |
| 2,568,448 | Hansen | Sept. 18, 1951 |
| 2,577,368 | Schultz et al. | Dec. 4, 1951 |
| 2,684,454 | Huffman | July 20, 1954 |

FOREIGN PATENTS

| | | |
|---|---|---|
| 868,403 | France | Sept. 29, 1941 |